(12) United States Patent
Holstine et al.

(10) Patent No.: US 11,554,870 B1
(45) Date of Patent: Jan. 17, 2023

(54) EJECTION SEAT WATER RECOVERY

(71) Applicant: AMI Industries, Inc., Colorado Springs, CO (US)

(72) Inventors: Steve Holstine, Peyton, CO (US); Jonathan Wheeler, Colorado Springs, CO (US); John Hampton, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 0 days.

(21) Appl. No.: 17/398,916

(22) Filed: Aug. 10, 2021

(51) Int. Cl.
*B64D 25/10* (2006.01)
*B64D 25/18* (2006.01)

(52) U.S. Cl.
CPC ............. *B64D 25/10* (2013.01); *B64D 25/18* (2013.01)

(58) Field of Classification Search
CPC .................................. B64D 25/10; B64D 25/18
See application file for complete search history.

(56) References Cited

U.S. PATENT DOCUMENTS

| | | | |
|---|---|---|---|
| 3,190,589 A | 6/1965 | Theodor | |
| 3,296,635 A | 1/1967 | Treacy | |
| 4,384,857 A | 5/1983 | Hoy, Jr. | |
| 5,979,829 A * | 11/1999 | Nance | B64D 25/10 244/141 |
| 6,036,563 A | 3/2000 | Walker | |
| 6,412,865 B1 | 7/2002 | Bedard | |
| 9,051,032 B2 | 6/2015 | Hanel | |
| 2004/0177798 A1 | 9/2004 | Charles et al. | |
| 2009/0233505 A1 * | 9/2009 | Kwok | B60R 21/16 441/80 |

FOREIGN PATENT DOCUMENTS

WO  WO-2011047692 A1 *  4/2011  ............. B64D 11/06

* cited by examiner

*Primary Examiner* — Richard G Davis
(74) *Attorney, Agent, or Firm* — Suiter Swantz pc llo

(57) ABSTRACT

An ejection seat system is described. The ejection seat system includes a seat frame for supporting an aircraft occupant. The seat frame includes one or more of a ballast material or an auto-inflating unit. By the ballast material or the auto-inflating unit, the seat frame may be positively buoyant in saltwater or freshwater for improved recovery of the seat frame. The ballast material may include one or more of a gas or foam. The auto-inflating unit may include one or more of a pump or a gas cartridge. Such flotation means may be included within an internal void of one or more of a seat bucket or a seat back of the seat frame.

15 Claims, 2 Drawing Sheets

EJECTION SEAT WATER RECOVERY

TECHNICAL FIELD

The present disclosure generally relates to aircraft equipment and more particularly for ejection seats.

BACKGROUND

An aircraft pilot may eject from a moving aircraft by an ejection seat. The aircraft pilot may then be separated from the ejection seat. The ejection seat may then fall to the ground. The ejection seat is recovered for crash investigation purposes. In an ejection that occurs over water, the ejection seat will sink to the bottom of the ocean or body of water. Recovery of the ejection seat from the bottom of the body of water requires significant resources, logistics, cost, time, and specialized equipment. Deep water seat extraction can take weeks, allowing corrosion to degrade the electronics leading to potential loss of investigation data. Therefore, it would be advantageous to provide a device, system, and method that cures the shortcomings described above.

SUMMARY

An ejection seat system is disclosed, in accordance with one or more embodiments of the present disclosure. In one embodiment, the ejection seat system includes a seat frame for supporting an aircraft occupant. In another embodiment, the seat frame includes a seat bucket. In another embodiment, the seat frame includes a seat back coupled to the seat bucket. In another embodiment, at least one of the seat bucket or the seat back includes an interior void. In another embodiment, the seat frame includes a ballast material disposed within the interior void of at least one of the seat bucket or the seat back. In another embodiment, the seat frame includes an average density of less than 1.02 grams per cubic centimeter. In another embodiment, the ejection seat subsystem further includes a propulsion subsystem for propelling the seat frame free of an aircraft in response to an eject signal. In another embodiment, the ejection seat subsystem includes a seat-to-pilot separator subsystem for separating the aircraft occupant from the seat frame subsequent to propulsion of the seat frame free of the aircraft. In another embodiment, the seat frame is positively buoyant in a fluid with a density of between 1.02 and 1.03 grams per cubic centimeter subsequent to separating from the aircraft occupant. Such liquid may include ocean water. In further embodiments, the seat frame is positively buoyant in a fluid with a density of 1 gram per cubic centimeter. Such liquid may include fresh water.

An ejection seat system is disclosed, in accordance with one or more embodiments of the present disclosure. In one embodiment, the ejection seat system includes a seat frame for supporting an aircraft occupant. In another embodiment, the seat frame includes a seat bucket. In another embodiment, the seat frame includes a seat back coupled to the seat bucket. In another embodiment, the seat frame includes an auto-inflating unit coupled with one or more of the seat bucket or the seat back. In another embodiment, the auto-inflating unit includes an inflatable bladder. In another embodiment, the ejection seat subsystem includes a propulsion subsystem for propelling the seat frame free of an aircraft in response to an eject signal. In another embodiment, the ejection seat system includes a seat-to-pilot separator subsystem for separating the aircraft occupant from the seat frame subsequent to propulsion of the seat frame free of the aircraft. In another embodiment, the inflatable bladder is configured to inflate with a gas subsequent to the aircraft occupant separating from the seat frame. In another embodiment, the seat frame includes an average density of less than 1.02 grams per cubic centimeter subsequent to the inflatable bladder inflating with the gas such that the seat frame is positively buoyant in a fluid with a density of between 1.02 and 1.03 grams per cubic centimeter.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1:
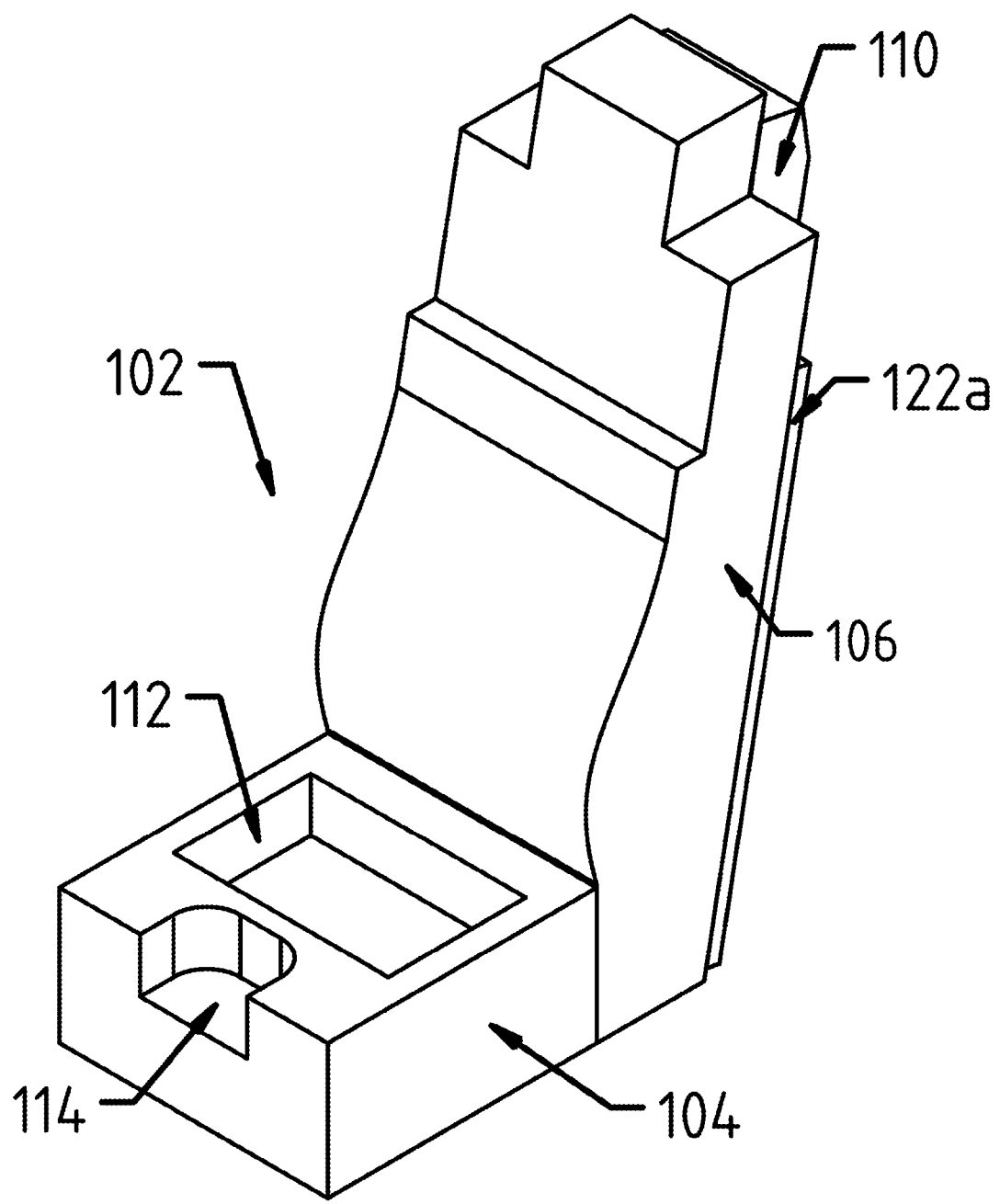
FIG. 1 depicts a perspective view of an ejection seat system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Broadly the present disclosure is directed to ejection seat systems. In example implementations, the concepts of the present disclosure may be incorporated in the seats of an aircraft for ejecting a pilot for providing a means of recovering the ejection seat from water.

Figure 2:
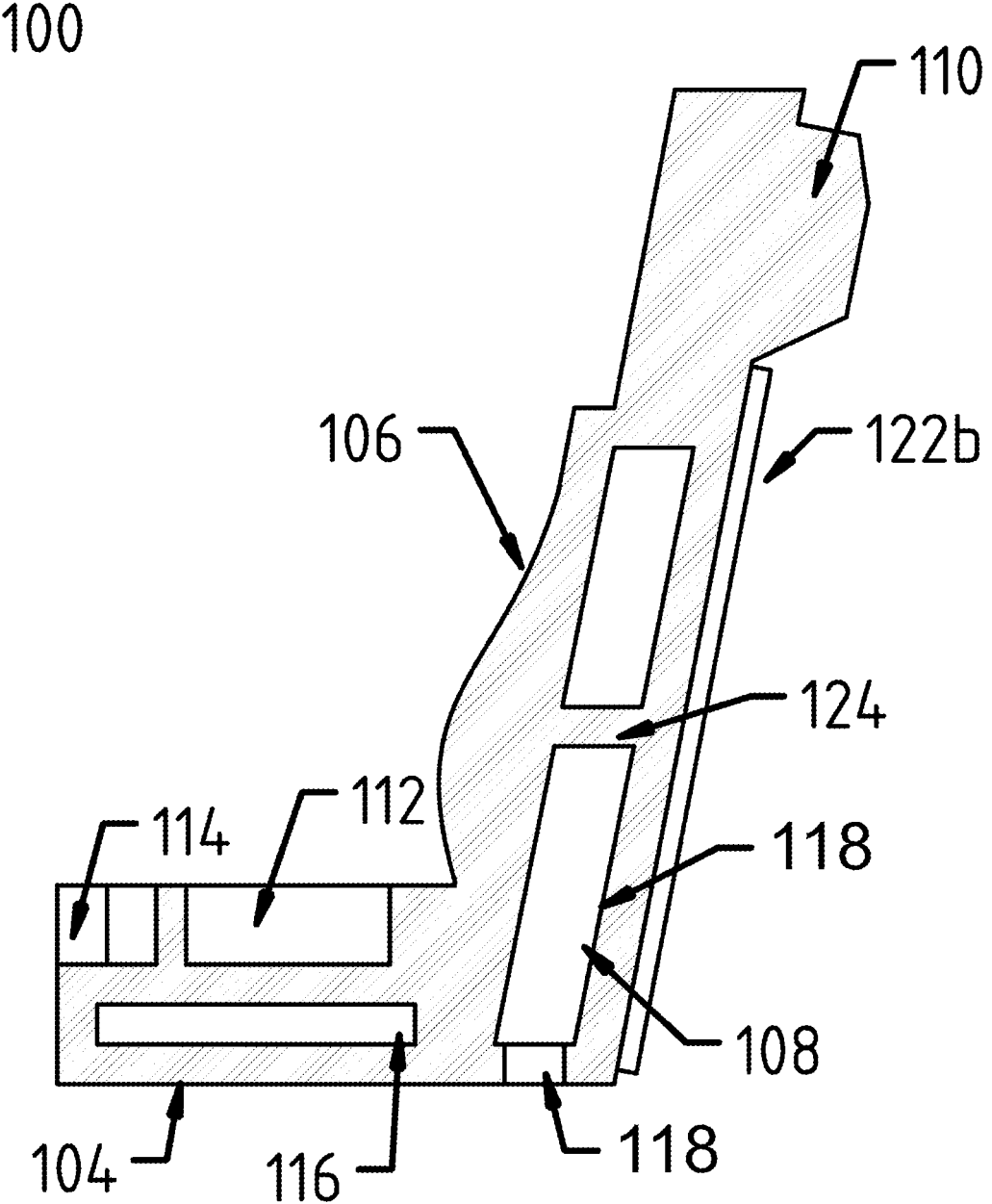
FIG. 2 depicts a side cross-section view of an ejection seat system, in accordance with one or more embodiments of the present disclosure.

Referring now to FIGS. 1 and 2, an ejection seat system 100 is described, in accordance with one or more embodiments of the present disclosure. The system 100 may include a seat frame 102. The seat frame 102 may include, but is not limited to, a seat bucket 104 and a seat back 106. The seat frame 102 may further include a ballast material or an auto-inflating unit. The system 100 may further include a propulsion subsystem 108 and a seat-to-pilot separator subsystem 110. The ejection seat system 100 may further include, but is not limited to, a harness, a head restraint, an arm restraint, a leg restraint, an ejection handle, or various other components known in the art of ejection seats.

The seat back 106 may be coupled to the seat bucket 104. In some embodiments, the seat back 106 and the seat bucket 104 are formed in a modular fashion. Such seat back 106 and seat bucket 104 may be detachably attached for assembly and maintenance purposes. The seat back 106 and seat bucket 104 may be detachably attached in any fashion known in the art. The seat back 106 may include a data recorder (not depicted). The data recorder may be configured to record data associated with an ejection of the ejection seat system 100. Such data recorder may be included within the seat back 106. In this regard, recovery of the data recorder is desirable for crash analysis purposes. Accordingly, the seat back 106 may be configured to float in water for providing rapid recovery of the data recorder.

The system 100 may include the propulsion subsystem 108. The propulsion subsystem 108 may propel the seat frame 102 free of the aircraft in response to an eject signal. The propulsion subsystem 108 may include a catapult and a primary rocket motor for propelling the seat frame 102. Such catapult and rocket motor may be disposed in the seat back 106. Such ejection signal may be initiated by the pilot (e.g., by an ejection handle) or by a flight system. The rocket motor may expel a propellant for generating a thrust vector to propel the seat frame 102 free of the aircraft.

The propulsion subsystem 108 may optionally include a stability package (STAPAC). The stability package may compensate for pitch changes during ejection. The stability package may include a gyro controlled vernier rocket motor (not depicted) mounted below the seat bucket 104 which provides secondary control of a pitch of the thrust vector, in accordance with stability packages known in the art. In this regard, a nozzle of the vernier rocket motor may be controlled to stabilize the system 100 during ejection. Advantageously, the stability package may provide a pitch tolerance for the system 100, such that a difference between the center of gravity of the seat frame 102 front-to-back relative to the thrust vector may be accounted. However, the seat frame 102 may include a more limited center of gravity tolerance side-to-side with respect to the thrust vector.

The system 100 may include the seat-to-pilot separator subsystem 110. The seat-to-pilot separator subsystem 110 may separate the aircraft occupant from the seat frame 102. For example, subsequent to propulsion of the seat frame 102 free from the aircraft by the propulsion subsystem 108, the seat-to-pilot separator subsystem 110 may be engaged for separating the aircraft occupant from the seat frame 102. The seat-to-pilot separator subsystem 110 may include a pilot recovery parachute. Subsequent to separation, one or more components of the system 100 may be separated from the seat frame 102, such as, but not limited to, the seat-to-pilot separator subsystem 110, a seat cushion, propellant material of the propulsion subsystem 108, or a survival kit housed within the seat system 100.

The seat frame 102 may include an average density. The average density of the seat frame 102 may be determined based on a total volume of liquid displaced by the seat frame 102 and a mass of the seat frame 102. In this regard, the average density may be equal to the volume of liquid displaced by the seat frame 102 divided by a mass of the seat frame 120. For example, the average density of the seat frame 102 may be 1.02 grams per cubic centimeter or less, such that the seat frame 102 is configured to be positively buoyant (e.g., float) in a liquid with a density between 1.02 and 1.03 grams per cubic centimeter (i.e., saltwater). By way of another example, the average density of the seat frame 102 may be less than 1 gram per cubic centimeter, such that the seat frame 102 is configured to be positively buoyant (e.g., float) in a liquid with a density of 1 gram per cubic centimeter (i.e., freshwater). Thus, when the aircraft occupant is separated from the seat frame 102 by the seat-to-pilot separator subsystem 110, the seat frame 102 may be positively buoyant in the liquid.

As may be understood, the various concepts provided herein may be provided for a variety of ejector seats. In some instances, the seat frame 102 may weigh between 100 and 200 pounds (between 45.3 and 90.7 kilograms). The ejection seat system 100 may further be certified for an aircraft occupant between a range of weights, such as, but not limited to, between 103 and 245 pounds. In some instances, the range of certified weights are between 140 and 211 pounds.

In some embodiments, one or more of the seat bucket 104 or the seat back 106 include one or more internal voids. By the internal voids, the seat frame 102 may be positively buoyant in the liquid subsequent to the pilot separating from the seat frame 102.

For example, the seat bucket 104 may include a hollow portion 112. The hollow portion 112 may be disposed below a pan cushion (not depicted), the pan cushion cushioning the pilot's hip bones. The hollow portion 112 may be configured to receive a pilot survival kit (not depicted). Internal void 116 may be disposed below the hollow portion 112 of the seat bucket 104. The seat bucket 104 may further include one or more ejection mechanisms (not depicted). Such ejection mechanisms may be disposed along a lateral side of the seat bucket 104 or may be disposed between the legs of the pilot. Where the ejection mechanism is located between the legs of the pilot, or may be disposed to the outside edges of the set bucket 104, the ejection mechanism may be disposed within a curved recess 114 of the seat bucket 104 which the legs may surround. Such internal void 116 may be one or more of watertight, airtight, include a ballast material, or include an auto-inflating unit, as will be described further herein.

By way of another example, the seat back 106 may include an internal void 118. The internal void 118 may run along a substantial length of the seat back 106, such as from a bottom of the seat back 106 up to one or more of the separation subsystem 110 or a headrest portion of the seat back 106. The propulsion subsystem 108 may be disposed within the internal void 118. The internal void 118 may extend to a bottom opening 120 of the seat back 106 through which a propellant may be expelled by the propulsion subsystem 108. The seat back 106 may further include rails 122a, 122b. The rails 122a, 122b may be configured to slidably couple with the aircraft. During ejection, the rails 122a, 122b may guide the ejection seat system 100. The ejection seat system 100 may include one or more ribs 124 disposed between the rails 122a, 122b. The ribs 124 may surround the propulsion subsystem 108 to provide stability during ejection. The ribs 124 may further segment the internal void 118 into one or more compartments. In this regard, the internal voids 126 may be disposed between the rails 122a, 122b. Such internal void 118 may be one or more of watertight, airtight, include a ballast material, or include an auto-inflating unit, as will be described further herein.

In some embodiments, the seat frame 102 may include a ballast material (not depicted) disposed within the internal voids of the seat bucket 104 or the seat back 106. Such ballast material and internal void may improve the buoyancy of the seat frame 102. The incorporation of ballast material may thus allow the seat frame to float upon freshwater or saltwater after ejection and separation from the aircraft occupant. The ballast material may further be located within any suitable position of the seat frame 102 for improving the buoyancy of the seat frame 102.

The ballast material may include, but is not limited to, a foam. The foam may include any foam known in the art, such as, but not limited to, a polystyrene material, a polyurethane material, or a polyethylene material. Such foam may be cut to a desired shape and inserted within the internal void. Similarly, such foam may be blown-in to such internal void and allowed to set. In some embodiments, the seat back 106 may include a headrest made of one or more tubes. Such foam may be added to tubes of the headrest.

The ballast material may also include, but is not limited to, a material in a gaseous state. For example, the material in the gaseous state may include one or more of oxygen, nitrogen, or carbon dioxide. The gas may be sealed within the internal void. The gas may include a pressure such as, but not limited to, an atmospheric pressure or greater (i.e., pressurized) at standard temperature and pressure (STP) (i.e., a temperature of 273.15 Kelvin and an absolute pressure of 1 bar).

In some embodiments, the internal voids may be one or more of watertight or airtight. The internal voids may be one or more of watertight or airtight by being sealed. Such internal voids may be impermeable to water at standard temperature and pressure, such that no substantial amount of water may pass from or to the interior void. By being impermeable to water, the average density of the seat frame 102 may be maintained in the event the seat frame 102 is submerged in water (e.g., when landing in an ocean or other body of water). The watertight property may be advantageous where the internal void includes the ballast material. Similarly, such internal voids may be impermeable to air at standard temperature and pressure, such that no substantial amount of air may pass from or to the interior void. By being impermeable to air, the gas component of the ballast material may be prevented from escaping the internal void. Such ballast material may be secured in the internal voids such that during ejection, the ballast material may be secured within the internal void. In this regard, the ejection seat system 100 may undergo gravitational force equivalents of ten or more during ejection, during which the ballast material may remain disposed within the internal voids.

Although the seat frame 102 is described as including ballast material, this is not intended as a limitation on the present disclosure. In some embodiments, the seat frame 102 includes an auto-inflating unit. The auto-inflating unit may be coupled to one or more of the seat bucket 104 or the seat back 106. For example, the auto-inflating unit may be coupled within one or more of the interior voids of the seat bucket 104 or the seat back 106. Where the auto-inflating unit is coupled within the interior void, the auto-inflating unit may further be configured to inflate the inflatable bladder beyond the volume of the interior void. In this regard, an average density of the seat frame 102 may further be reduced by increasing the total volume of the seat frame 102.

The auto-inflating unit may include an inflatable bladder. In some embodiments, the auto-inflating unit may include one or more pumps by which the inflatable bladder is filled with a gas. The pumps may be configured to inflate the inflatable bladder subsequent to ejection and prior to impacting with the liquid. In other embodiments, the auto-inflating unit may include one or more gas cartridges. The gas cartridge may include a pressurized gas, such as, but not limited to, carbon dioxide or nitrogen. The gas cartridge may be configured to fill the inflatable bladder with the gas. In some embodiments, the auto-inflating unit may include a water sensor. The water sensor may detect that the water sensor is submerged in a liquid. For example, the water sensor may include, but is not limited to, a water-dissolvable chemical bobbin or a hydrostatic pressure sensor. The gas cartridge may inflate the inflatable bladder subsequent to the water sensor detecting the water sensor is submerged in the liquid. In this regard, the inflatable bladder may be inflated subsequent to the seat frame 102 impacting the water surface. By inflating the inflatable bladder subsequent to impacting the water surface, a probability of the inflatable bladder bursting due to the impact force may be reduced. Such impact forces may be caused, at least in part, by a substantial momentum of the seat frame 102 from one or more of the flight, the ejection, the aircraft occupant separation, or falling to earth.

Thus, the seat frame 102 may include a flotation means, such as the ballast material or the auto-inflation unit, by which the seat frame 102 may float in water. By floating, the seat frame 102 may include an improved water recovery cost and time savings. In this regard, the seat frame 102 may be recovered by boat or helicopter, instead of by a diving team or submarine. Such boat or helicopter recovery may also be performed much more quickly, as compared to an underwater recovery. Furthermore, corrosive effects associated with the salt water may be reduced by the rapid recovery.

One or both of the seat bucket 104 and the seat back 106 may include such ballast material or auto-inflating unit. In some embodiments, the seat bucket 104 and the seat back 106 are modular. In this regard, the seat bucket 104 may be separated from the seat back 106 on impact with the water surface. Both the seat bucket 104 and the seat back 106 may be configured to be positively buoyant in the liquid, even after separating, by providing the ballast material and/or the auto-inflation unit within the seat bucket 104 and the seat back 106.

Furthermore, one or more of the ballast material or auto-inflating unit may be provided such that the center of gravity of the seat frame 102 is within an acceptable range of the centerline of the seat back 106. By maintaining the center of gravity within the range of the centerline, a pitch or roll of the seat frame 102 may be maintained when the propulsion subsystem 108 propels the seat frame 102 free of the aircraft. For example, the weight of the foam material added to the interior void 116 or the interior void 118 such that a center of gravity of the seat frame 102 is within allowable limits with respect to the thrust vector of the propulsion subsystem 108, such as, but not limited to five hundredths of an inch.

In some embodiments, the seat frame 102 may further include a beacon (not depicted). The beacon may emit electromagnetic radiation in a visible light spectrum. In some embodiments, the beacon may emit the visible light subsequent to the aircraft occupant detaching from the seat frame. In this regard, the beacon may emit visible light for providing a visual indicator for retrieval of the seat frame. Such visible light may be used by a helicopter or ship for locating the seat frame. In some embodiments, the beacon comprises a strobe. The strobe may produce flashes of light with a frequency.

In some embodiments, the seat frame 102 may further include a recovery hook (not depicted), the recover hook may include a loop by which a helicopter recovery hitch or rope may be received.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting. Furthermore, the various geometries depicted in the accompanying figures are not intended to be limiting and that various modifications are contemplated.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An ejection seat system, comprising:
a seat frame for supporting an aircraft occupant, said seat frame including a seat bucket, a seat back coupled to the seat bucket, and a ballast material disposed within an interior void of at least one of the seat bucket or the seat back; wherein the interior void is at least one of watertight or airtight, wherein the seat frame includes an average density of less than 1.02 grams per cubic centimeter;
a propulsion subsystem for propelling the seat frame free of an aircraft in response to an eject signal; and
a seat-to-pilot separator subsystem for separating the aircraft occupant from the seat frame subsequent to propulsion of the seat frame free of the aircraft; wherein the seat frame is positively buoyant in a fluid with a density of between 1.02 and 1.03 grams per cubic centimeter subsequent to separating from the aircraft occupant.

2. The ejection seat system of claim 1, wherein the seat frame includes an average density of less than 1 gram per cubic centimeter, wherein the seat frame is positively buoyant in a fluid with a density of 1 gram per cubic centimeter subsequent to separating from the aircraft occupant.

3. The ejection seat system of claim 2, wherein the ballast material comprises at least one of a foam or a material in a gaseous state.

4. The ejection seat system of claim 3, wherein the foam is provided within the interior void such that a center of gravity of the seat frame is within a tolerance to the thrust vector of the propulsion subsystem.

5. The ejection seat system of claim 1, wherein the seat back is positively buoyant in the fluid with the density of between 1.02 and 1.03 grams per cubic centimeter subsequent to the seat bucket being detached from the seat back.

6. The ejection seat system of claim 1, the seat bucket further comprising a hollow portion for receiving a survival kit, wherein the inner void is disposed within the seat bucket below the hollow portion.

7. The ejection seat system of claim 1, wherein the seat bucket is positively buoyant in the fluid with the density of between 1.02 and 1.03 grams per cubic centimeter subsequent to the seat back being detached from the seat bucket.

8. The ejection seat system of claim 1, the seat back further comprising a first guide rail and a second guide rail, wherein the inner void is disposed within the seat back between the first guide rail and the second guide rail.

9. The ejection seat system of claim 1, the seat back further comprising a hook for receiving a rescue line for retrieval of the seat back from the liquid, the seat back further comprising a beacon, the beacon configured to emit electromagnetic radiation with a wavelength in the visible spectrum.

10. An ejection seat system comprising:
a seat frame for supporting an aircraft occupant, said seat frame including a seat bucket, a seat back coupled to the seat bucket, and an auto-inflating unit coupled with at least one of the seat bucket or the seat back, the auto-inflating unit including an inflatable bladder;
a propulsion subsystem for propelling the seat frame free of an aircraft in response to an eject signal; and
a seat-to-pilot separator subsystem for separating the aircraft occupant from the seat frame subsequent to propulsion of the seat frame free of the aircraft; wherein the inflatable bladder is configured to inflate with a gas subsequent to the aircraft occupant separating from the seat frame; wherein the seat frame includes an average density of less than 1.02 grams per cubic centimeter subsequent to the inflatable bladder inflating with the gas such that the seat frame is positively buoyant in a fluid with a density of between 1.02 and 1.03 grams per cubic centimeter.

11. The ejection seat system of claim 10, wherein the seat frame includes an average density of less than 1 grams per cubic centimeter subsequent to the inflatable bladder inflating with the gas such that the seat frame is positively buoyant in a fluid with a density of 1 gram per cubic centimeter.

12. The ejection seat system of claim 10, wherein the auto-inflating unit comprises a pump, wherein the gas is an atmospheric gas, wherein the pump is configured to fill the inflatable bladder with the atmospheric gas.

13. The ejection seat system of claim 10, wherein the auto-inflating unit comprises a gas cartridge configured to fill the inflatable bladder with the gas.

14. The ejection seat system of claim 13, wherein the auto-inflating unit further comprises a water sensor configured to detect that the water sensor is submerged in the liquid, wherein the gas cartridge is configured to fill the inflatable bladder with the gas in response to the water sensor detecting being submerged in the liquid.

15. The ejection seat system of claim 10, wherein the auto-inflating unit is coupled with at least one of the seat bucket or the seat back such that a center of gravity of the seat frame is within a tolerance to the thrust vector of the propulsion subsystem.

* * * * *